Dec. 23, 1924.  
E. A. RUTH  
STEREOSCOPE  
Filed Nov. 7, 1923  
1,520,311  
3 Sheets-Sheet 1
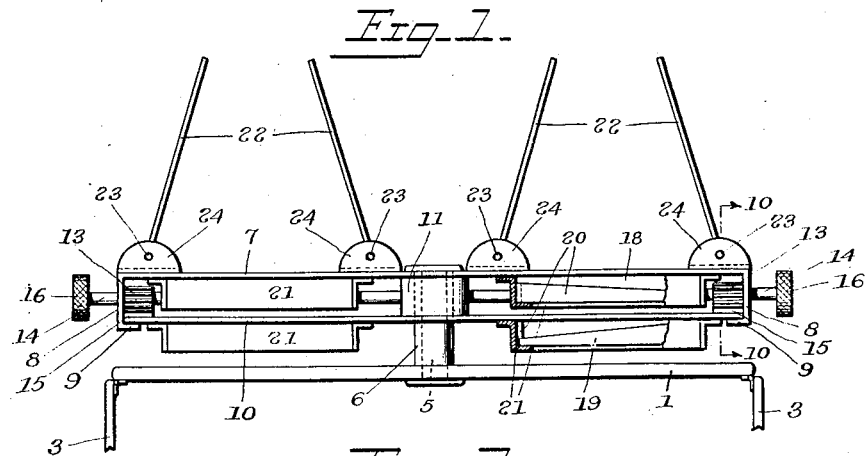
Earl A. Ruth  
By Elvans N. Haines  
Attorney Dec. 23, 1924.
E. A. RUTH
STEREOSCOPE
Filed Nov. 7, 1923      3 Sheets-Sheet 2
1,520,311
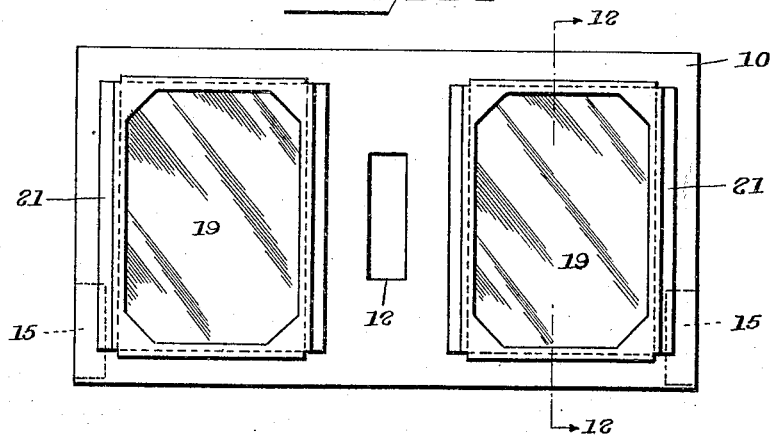
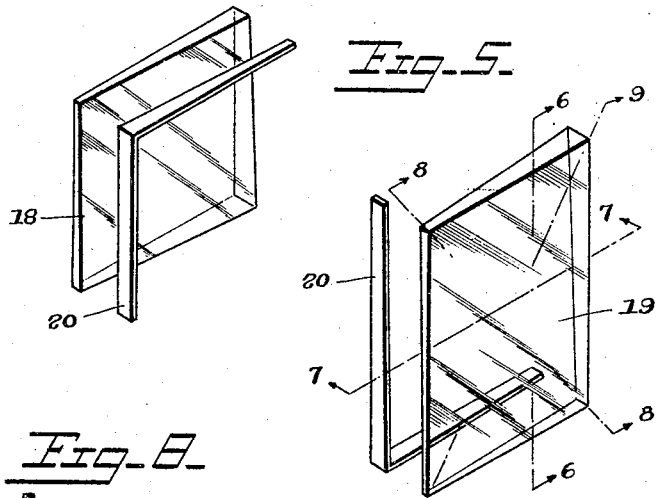
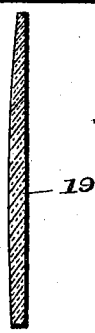
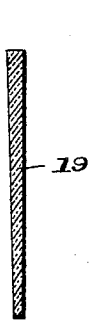
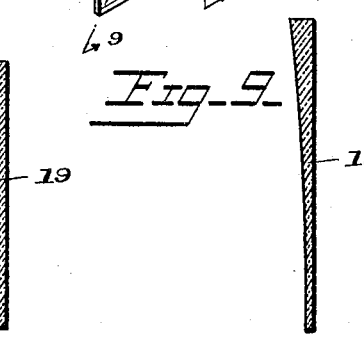
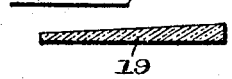
Inventor
*Earl A. Ruth*
By *Elvans D. Haines.*
Attorney Dec. 23, 1924.
E. A. RUTH
STEREOSCOPE
Filed Nov. 7, 1923
1,520,311
3 Sheets-Sheet 3
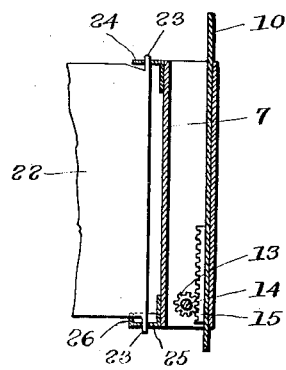
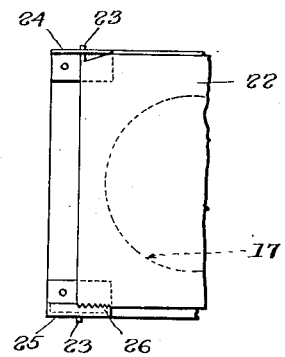
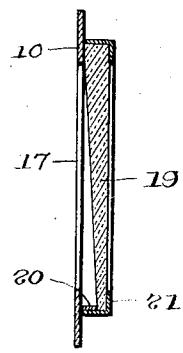
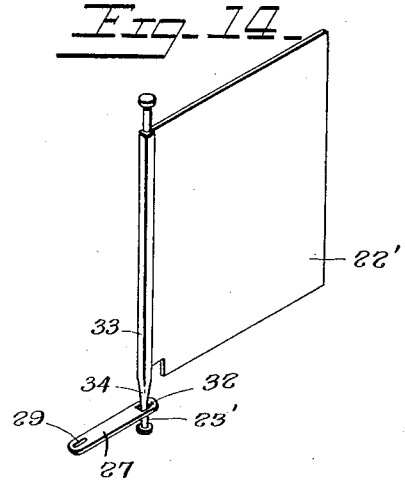
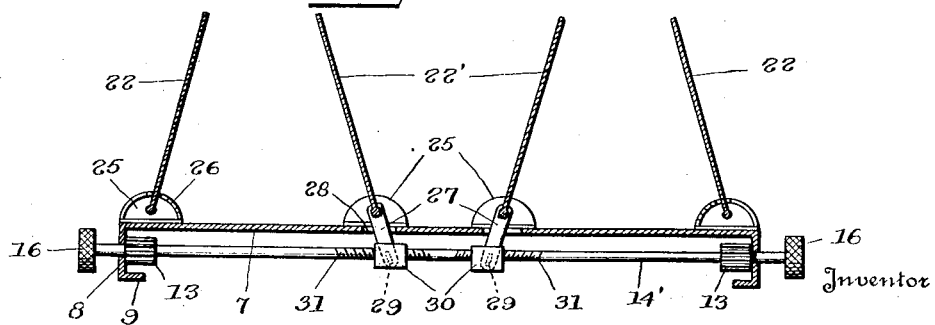
Inventor
Earl A. Ruth
By Evans D. Haines.
Attorney Patented Dec. 23, 1924.

1,520,311

UNITED STATES PATENT OFFICE.

EARL A. RUTH, OF WASHINGTON, DISTRICT OF COLUMBIA.

STEREOSCOPE.

Application filed November 7, 1923. Serial No. 673,322.

*To all whom it may concern:*

Be it known that EARL A. RUTH, a citizen of the United States, residing at Washington, in the District of Columbia, has invented certain new and useful Improvements in Stereoscopes, of which the following is a specification.

This invention relates to optical devices, and particularly to stereoscopes which are used in viewing stereoscopic pictures to bring the images of such pictures into coincidence and make them appear as one.

The invention has been designed in order to provide a device with which to view stereoscopic pictures from a distance and primarily as an attempt to make the production of stereoscopic motion and other projection pictures a practical achievement; and includes within its principle, novel means for focusing the images of stereoscopic pictures into coincidence while the stereoscope is at any distance from the pictures, novel means for maintaining such images in coincidence in spite of deviating movements of the supporting frame of the stereoscope with respect to the relative alinement of the stereoscopic pictures, and novel means for eliminating the images of the pictures from the view of the opposite eyes regardless of the distance from which the pictures are viewed with the stereoscope.

The novel combination and arrangement of parts and features of construction contained in the invention are hereinafter fully described and claimed, and exemplified by the accompanying drawings in which practical embodiments of the invention are illustrated.

In the drawings:—

Figure 1 is a top view of a pair of stereoscopic spectacles constructed in accordance with the principles of the invention;

Fig. 2 is a rear view of the device;

Fig. 3 is a rear view of what is hereinafter called the front plate;

Fig. 4 is a similar view of what is hereinafter called the rear plate;

Fig. 5 is a perspective view of one pair of the prisms;

Figs. 6, 7, 8 and 9 are sectional views of one of the prisms, taken substantially upon the planes indicated by the lines 6—6, 7—7, 8—8, and 9—9, respectively, of Fig. 5;

Fig. 10 is a vertical sectional view of a portion of the device, taken substantially on the plane indicated by the line 10—10 of Fig. 1;

Fig. 11 is a front view of a portion of the front plate;

Fig. 12 is a vertical sectional view of a portion of the device, taken substantially on the plane indicated by the line 12—12 of Fig. 4;

Fig. 13 is a horizontal sectional view of a portion of a device embodying additional novel features of the invention; and Fig. 14 is a perspective view of one of the shields of the device illustrated in Fig. 13, and parts associated therewith.

The stereoscope illustrated in the drawings is adapted to be used to view a pair of stereoscopic pictures arranged side by side in horizontal alinement. These pictures are not carried by a frame forming part of the stereoscope as is the case with most stereoscopes, but are supported entirely independently of the stereoscope and may be viewed with the stereoscope at any distance therefrom. Thus, the pictures may be stereoscopic motion or other projection pictures.

The device includes a supporting frame which is preferably in the form of a spectacle frame 1 having a nose bridge 2 and a pair of ear engaging arms 3. Fixed to the frame 1 between the sight openings 4 thereof and extending forwardly from the frame is a stud 5, upon which is pivotally mounted a sleeve 6 carried by a plate 7, from which it extends rearwardly. The extremities of the plate 7, which may be termed a front plate, are bent rearwardly as at 8 and then inwardly as at 9 to provide guides in which the ends of a rear plate 10 are slidably mounted. The ends of the plate 10 are maintained against the portions 9 of the plate 7 by means of a spacing member 11, which surrounds the sleeve 6 and is interposed between the two plates. The sleeve 6 extends through an elongated opening 12 formed in the rear plate 10. The ends of this opening are adapted to engage the sleeve 6 and limit the upward and downward movement of the rear plate 10 with respect to the front plate 7.

The rear plate 10 is raised and lowered in a plane parallel to the front plate 7 by means of a pair of pinions 13 fixed upon an operating shaft 14 which has its ends mounted in the portions 8 of the plate 7. These pinions engage the teeth of racks 15 secured to the front of the rear plate 10. The extremities of the shaft 14 extend beyond the portions 8 of the plate 7, where they are provided with operating nobs 16.

The plates 7 and 10 are provided with a pair of openings 17 in line with the openings 4 of the spectacle frame, and over these openings prisms are mounted in a convenient manner. The prisms which are mounted upon the front plate 7 are designated as 18, while those which are mounted upon the rear plate 10 are designated as 19.

The angles of refraction of all of the prisms 18 and 19 uniformly vary from one end thereof to the other, and such angles of each pair of prisms 18, 19, vary in inverse order. The prisms 19 are preferably longer than the prisms 18, but nevertheless the angles of refraction of all of the prisms uniformly vary by the same degree per unit of length. In other words, referring especially to Fig. 5, it will be noted that the angle between the front and rear faces of the prism 19 uniformly decreases from top to bottom, and that the angle between such faces of the prism 18 increases from top to bottom. One face of each prism is flat but the other face is unusual because a line cut by any vertical and horizontal plane upon this surface will be straight as shown in Figs. 6 and 7, whereas lines cut by oblique planes will be slightly convex or concave as shown by Figs. 8 and 9 respectively, depending upon the particular corners through which such planes pass.

By having the angles of refraction of the prisms varying in the above-described manner, various angles of refraction by each pair of prisms 18, 19, may be obtained by raising and lowering the prisms 19 with respect to the prisms 18. It will thus be understood that the device may be focused so as to bring the image of one of a pair of stereoscopic pictures arranged side by side over the image of the other picture, regardless of variations in the distance of the pictures from the observer.

In order to prevent a possible distortion of the image, it is preferable to mount the prisms 18 with their flat faces forward and the prisms 19 with their flat faces rearward and parallel to the flat faces of the prisms 18. Therefore, right angular spacing members 20 are used in conjunction with the frames 21 by which the prisms are mounted upon the plates 7 and 10.

Effective focusing of the device for various distances is brought about by the adjustment of a means used in conjunction with the prisms, to eliminate images of the stereoscopic pictures from the view of the opposite eyes. This means includes shields 22 which are pivoted to the front of the front plate 7 and which may be adjusted to various angles with respect thereto. There are two of these shields 22 for each pair of prisms, and these have their inner ends pivoted to the plate 7 on opposite sides of the openings 17.

The shields 22 may have their inner ends provided with pivot pins 23 which extend through apertures in upper and lower ears 24 and 25 projecting from the plate 7. The ears 24 are preferably resilient so as to yieldably press downwardly upon the upper edges of the shields, while the ears 25 are preferably provided with serrated flanges 26, into the serrations of which the lower edges of the shields are pressed. By this means the shields may be maintained in various adjusted positions, but those of each pair may be swung into overlapping relation alongside of the plate 7 when the device is not in use.

Adjustment of the outermost shields 22 is not so important, as such shields merely serve to prevent objects on the right and left of the stereoscopic pictures from possibly being seen through the prisms and serve as a guide for the eyes in locating the images of the pictures; but proper adjustment of the innermost shields is important, for these shields prevent an image of the right stereoscopic picture from being seen with the left eye, and vice versa.

In some instances it may be desirable to automatically adjust the angles of the innermost shields simultaneously with the relative adjustment of the prisms, so in Figs. 13 and 14 a means for accomplishing this result is illustrated. In this case, the innermost shields 22' are provided with arms 27, which extend rearwardly through openings 28 in the front plate 7 and have their rear ends pivotally connected by pin and slot connections 29 to nut members 30 mounted upon right and left hand threaded portions 31 of the shaft 14', so that turning of the shaft will cause the members 30 to be moved toward and away from each other, thereby swinging the arms 27 and the innermost shields 22'.

In this form of device it is of course desirable to have the shields 22' mounted so that they can be folded alongside of the plate 7 when the device is not in use. To do this provision is made to uncouple the innermost shields 22' from the arms 27. The forward ends of the arms 27 are, therefore, provided with square apertures 32, into which fit square portions 33 formed on the lower pivot pins 23' of such shields. These shields may be raised until the square portions 33 of the lower pivot pins are withdrawn from the apertures 32 in the arms 27, and when that has been done the shields may be swung alongside of the plate 7. In order that a quick coupling of the shields to the arms 27 may be again effected the pivot pins 23' taper as at 34 into cylindrical shape below their square portions 33. These tapered portions 34 serve to properly guide the square portions 33 of the pins into the apertures 32 as the shields are swung away from the plate 7 and are lowered.

The two plates 7 and 10, carrying the prisms, shields and operating means, are pivoted and balanced by gravity upon the stud 5 which extends forwardly from the supporting frame 1. This pivotal connection serves as a means for maintaining the images of the stereoscopic pictures in coincidence in spite of deviating movements of the frame 1 with respect to the relative alinement of the pictures. In other words, the plates 7 and 10, upon which the pairs of prisms are mounted, are balanced by gravity on the stud 5 so that the two pairs of prisms are maintained in relative alinement with the pair of stereoscopic pictures, regardless of any tilting of the frame 1 with respect to the relative alinement of the two pictures. If it were not for this means, the least tilting of the frame 1 would throw the images of the pictures out of coincidence.

From the foregoing description, taken in connection with the accompanying drawings, the construction, operation and use of the invention will be understood by those skilled in the art to which it appertains. It will be apparent that by means of such a device the production of stereoscopic motion and other projection pictures may be made possible, inasmuch as the device can be focused so as to bring the two images into coincidence regardless of the distance from which the pictures are viewed. Moreover, the device may be worn as spectacles and the image seen will not be distorted in case the observer tilts his head, inasmuch as the part carrying the focusing means is pivoted to the spectacle frame to always maintain a horizontal position. Furthermore, the shields and ear engaging arms are foldable so that when the device is not in use it may be placed in a small case the same as any ordinary pair of spectacles.

The particular combination and arrangement of parts and the various features of construction, which constitute the novelty in the invention, are set forth and defined in the appended claims, but it is to be pointed out that within the meaning and scope of the claims the invention may be used for purposes other than those specified and may be modified in numerous respects.

What is claimed is:—

1. A focusing stereoscope for viewing two distant stereoscopic pictures, comprising a device adapted to be held immediately in front of the eyes, said device having two sight openings, one for each eye, at least one of said sight openings being provided with a combination of prisms which are relatively adjustable to horizontally vary the angle of refraction resulting from the combination, and means to adjust said prisms to focus the images of the stereoscopic pictures into coincidence while the device is held at any distance from the pictures.

2. A stereoscope having two pairs of prisms corresponding to the right and left eyes, the prisms of each pair being relatively adjustable, whereby the images of a pair of stereoscopic pictures may be focused into coincidence while the stereoscope is at any distance from the pictures, and means for simultaneously adjusting the prisms of each pair.

3. A stereoscope having two pairs of prisms corresponding to the right and left eyes, the prisms of each pair being relatively adjustable so as to vary the angle of refraction resulting from the combination to an exact and fine degree, whereby to focus the images of a pair of stereoscopic pictures into coincidence while the stereoscope is at any distance from the pictures, and means for simultaneously adjusting the prisms of each pair.

4. A focusing stereoscope for viewing two distant stereoscopic pictures, comprising a device adapted to be held immediately in front of the eyes, said device having two sight openings, one for each eye, at least one of said sight openings being provided with a combination of prisms which are relatively adjustable to vary the angle of refraction resulting from the combination, means to adjust said prisms to focus the images of the stereoscopic pictures into coincidence while the device is held at any distance from the pictures, and means to eliminate the images of the pictures from the view of the opposite eyes.

5. A focusing stereoscope for viewing two distant stereoscopic pictures, comprising a device adapted to be held immediately in front of the eyes, said device having two sight openings, one for each eye, at least one of said sight openings being provided with a combination of prisms which are relatively adjustable to vary the angle of refraction resulting from the combination, means to adjust said prisms to focus the images of the stereoscopic pictures into coincidence while the device is held at any distance from the pictures, and means which is adjustable to eliminate the images of the pictures from the view of the opposite eyes while the device is held at any distance from the pictures.

6. A stereoscope provided with a combination of prisms which are adjustable to focus the images of a pair of stereoscopic pictures into coincidence at any distance from the pictures, shields which are adjustably mounted to eliminate the images of said pictures from the view of the opposite eyes, and means for adjusting said shields simultaneously.

7. A stereoscope provided with a combination of prisms which are adjustable to focus the images of a pair of stereoscopic pictures into coincidence at any distance from the pictures, and shields extending forwardly from said prisms and being adjustable to various angles with respect to the planes thereof to eliminate the images of said pictures from the view of the opposite eyes.

8. A stereoscope provided with a combination of prisms which are adjustable to focus the images of a pair of stereoscopic pictures into coincidence at any distance from the pictures, shields extending forwardly from the inner edges of said prisms and being adjustable to various angles with respect to the planes thereof to eliminate the images of said pictures from the view of the opposite eyes, and additional shields extending forwardly from the outer edges of said prisms and being adjustable to various angles with respect to the planes thereof to eliminate objects outside of said pictures from view and to serve as a guide for the eyes.

9. A stereoscope provided with a combination of prisms which are adjustable to focus the images of a pair of stereoscopic pictures into coincidence at any distance from the pictures, means which is adjustable to eliminate the images of said pictures from the view of the opposite eyes, and means for adjusting said prisms and said means simultaneously.

10. A stereoscope provided with a combination of prisms which are adjustable to focus the images of a pair of stereoscopic pictures into coincidence at any distance from the pictures, shields extending forwardly from said prisms and being adjustable to various angles with respect to the planes thereof to eliminate the images of said pictures from the view of the opposite eyes, and means for adjusting said prisms and said shields simultaneously.

11. In a stereoscope, the combination of a pair of plates arranged one behind the other and one being adjustable in a plane parallel to the other, means to focus the images of a pair of stereoscopic pictures into coincidence while the stereoscope is at any distance from said pictures by the relative adjustment of said plates, shields pivoted at the front of the front plate and being adjustable to various angles with respect to said front plate to eliminate the images of said pictures from the view of the opposite eyes, means associated with said plates for adjusting one plate with respect to the other plate, said means including a shaft mounted upon one plate and having a portion provided with right and left threads, nut members fitted upon said threaded portion of said shaft, and arms extending from said shields and connected to said nut members, substantially as and for the purpose set forth.

12. In a stereoscope, the combination of a pair of plates arranged one behind the other and one being adjustable in a plane parallel to the other, means carried by said plates to focus the images of stereoscopic pictures into coincidence while the stereoscope is at any distance from said pictures by the relative adjustment of said plates, and means mounted upon said plates for adjusting one relatively to the other.

13. In a stereoscope, the combination of a pair of plates arranged one behind the other and one being adjustable in a plane parallel to the other, means carried by said plates to focus the images of stereoscopic pictures into coincidence while the stereoscope is at any distance from said pictures by the relative adjustment of said plates, a shaft mounted upon one plate, a pinion fixed upon said shaft, and a rack mounted upon the other plate and engaging said pinion, whereby said other plate is adjusted relatively to the first by the turning of said shaft.

14. A stereoscope adapted to be used to view a pair of stereoscopic pictures at any distance therefrom, comprising a supporting frame, means carried by said frame for focusing the images of said pictures into coincidence, and means for maintaining such images in coincidence in spite of deviating movements of said frame with respect to the relative alinement of said pictures.

15. A stereoscope adapted to be used to view a pair of stereoscopic pictures at any distance therefrom, comprising a supporting frame, means carried by said frame for focusing the images of said pictures into coincidence, means for maintaining such images in coincidence in spite of deviating movements of said frame with respect to the relative alinement of said pictures, and means for eliminating the images of said pictures from the view of the opposite eyes.

16. A stereoscope adapted to be used to view a pair of stereoscopic pictures at any distance therefrom, comprising means for focusing the images of said pictures into coincidence, means for eliminating the images of said pictures from the view of the opposite eyes, and a supporting frame to which said means are pivotally connected, whereby the images of said pictures are maintained in coincidence in spite of deviating movements of said frame with respect to the relative alinement of said pictures.

17. A stereoscope adapted to be used to view a pair of stereoscopic pictures at any distance therefrom, comprising means for focusing the images of said pictures into coincidence, means for eliminating the images of said pictures from the view of the opposite eyes, and a supporting frame to which said means are pivoted and balanced, whereby the images of said pictures are maintained in coincidence in spite of deviating movements of said frame with respect to the relative alinement of said pictures.

18. A stereoscope adapted to be used to view a pair of stereoscopic pictures at any distance therefrom, comprising means for focusing the images of said pictures into coincidence, means for eliminating the images of said pictures from the view of the opposite eyes, a frame to be held in front of the eyes, and a pivotal connection between said means and said frame, whereby said means may balance to maintain the images of said pictures in coincidence in spite of deviating movements of said frame with respect to the relative alinement of said pictures.

19. In a device of the class described, the combination of a pair of prisms arranged one behind the other and being relatively movable in parallel planes, the angles of refraction of said prisms varying from one end thereof to the other and such angles of one prism varying in inverse order from such angles of the other prism, whereby various angles of refraction by said pair of prisms may be obtained by adjusting them relatively in the manner stated.

20. In a device of the class described, the combination of a pair of prisms arranged one behind the other and being relatively movable in parallel planes, the angles of refraction of said prisms varying uniformly from one end thereof to the other and such angles of one prism varying in inverse order from such angles of the other prism, whereby uniformly varying angles of refraction by said pair of prisms may be obtained by adjusting them relatively in the manner stated.

21. In a device of the class described, the combination of a pair of prisms arranged one behind the other and one being movable in a plane parallel to the other, the angles of refraction of said prisms varying uniformly from one end thereof to the other and such angles of one prism varying in inverse order from such angles of the other prism, the movable prism being longer than the other prism but both prisms having their angles of refraction varying by the same degree per unit of length, whereby uniformly varying angles of refraction by said pair of prisms may be obtained by adjusting the movable prism with respect to the other prism in the manner stated.

In testimony whereof I affix my signature.

EARL A. RUTH.